(12) United States Patent
Zhu et al.

(10) Patent No.: US 7,739,962 B2
(45) Date of Patent: Jun. 22, 2010

(54) OPTICAL TABLES

(75) Inventors: Jianqiang Zhu, Shanghai (CN); Taiying Zeng, Shanghai (CN); Hongbiao Huang, Shanghai (CN); Tao Zhang, Shanghai (CN)

(73) Assignee: Shanghai Institute of Optics and Fine Mechanics the Chinese Academy of Sciences, Shanghai (CN)

( * ) Notice: Subject to any disclaimer, the term of this patent is extended or adjusted under 35 U.S.C. 154(b) by 547 days.

(21) Appl. No.: 11/563,006

(22) Filed: Nov. 23, 2006

(65) Prior Publication Data

US 2007/0144409 A1    Jun. 28, 2007

(30) Foreign Application Priority Data

Dec. 27, 2005    (CN) .................... 2005 1 0112023

(51) Int. Cl.
*A47B 37/00* (2006.01)
(52) U.S. Cl. ............... 108/28; 108/25; 428/116
(58) Field of Classification Search ............. 108/24–26, 108/28; 428/116; 248/637
See application file for complete search history.

(56) References Cited

U.S. PATENT DOCUMENTS

| | | | | |
|---|---|---|---|---|
| 2,948,937 A * | 8/1960 | Rapata | ..................... | 24/297 |
| 3,627,246 A * | 12/1971 | Widding et al. | .......... | 248/188.8 |
| 3,930,162 A * | 12/1975 | Reiss | ..................... | 250/385.1 |
| 4,241,892 A * | 12/1980 | Morris | ................... | 248/346.02 |
| 4,577,450 A * | 3/1986 | Large | ..................... | 52/787.12 |
| 4,645,171 A * | 2/1987 | Heide | ..................... | 248/637 |
| 5,021,282 A * | 6/1991 | Terry et al. | ................. | 428/116 |
| 5,093,957 A * | 3/1992 | Do | ............................. | 16/2.1 |
| 5,402,734 A * | 4/1995 | Galpin et al. | ................. | 108/28 |
| 5,771,093 A * | 6/1998 | Tinti et al. | ................... | 356/244 |
| 5,912,442 A * | 6/1999 | Nye et al. | ................... | 181/292 |
| 6,394,722 B1 * | 5/2002 | Kunt et al. | ................... | 411/82 |
| 7,040,239 B2 * | 5/2006 | Shelton et al. | ........... | 108/50.13 |
| 2002/0021502 A1 * | 2/2002 | Davies et al. | ............... | 359/811 |
| 2004/0134392 A1 * | 7/2004 | Sargeant et al. | .......... | 108/57.34 |
| 2004/0173123 A1 * | 9/2004 | Roig et al. | ..................... | 108/25 |

* cited by examiner

*Primary Examiner*—Janet M Wilkens
(74) *Attorney, Agent, or Firm*—Matthias Scholl P.C.; Matthias Scholl

(57) ABSTRACT

An optical table comprising an upper skin tapped with holes for mounting equipment, a lower skin with a plurality of through holes which is coaxial with the tapped holes on the upper skin in a one to one arrangement, a honeycomb core, a connecting side wall, and a number of tubes. The tubes are positioned between the interior of the upper and lower skins so as to connect the holes on both skins so that contaminants and residue will be unable to enter into the interior of the honeycomb core, and so that the optical table can be rapidly and thoroughly cleaned.

9 Claims, 4 Drawing Sheets

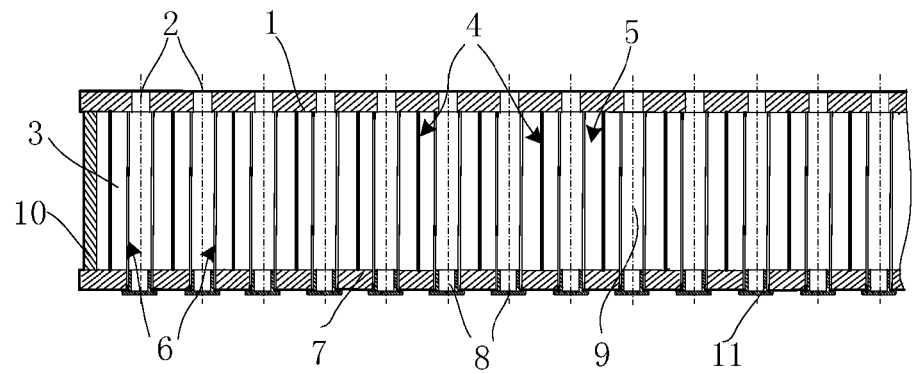
Fig. 4B
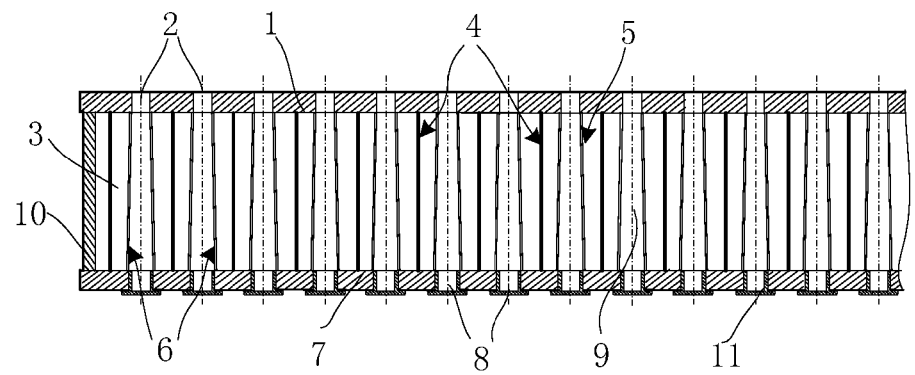
Fig. 4C
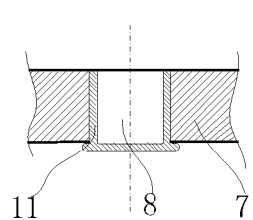 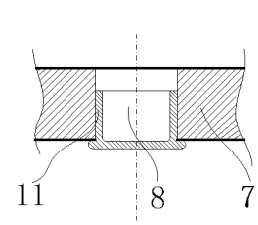 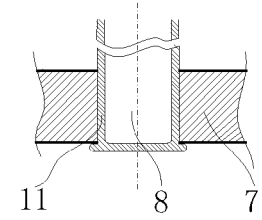
Fig. 5A    Fig. 5B    Fig. 5C

OPTICAL TABLES

CROSS-REFERENCE TO RELATED APPLICATIONS

This application claims priority to the Chinese Patent Application No. 200510112023.2 filed Dec. 27, 2005, the contents of which are incorporated herein by reference.

BACKGROUND OF THE INVENTION

1. Field of the Invention

The subject invention relates to optical tables and more particularly to honeycomb tabletops for optical tables used in supporting precision laboratory equipment and vibration control, especially for use in clean rooms, and other similar environments.

2. Brief Description of the Background of the Invention

Honeycomb tabletops are typically used for supporting and positioning of highly sensitive scientific equipment, such as optical devices. Honeycomb tabletops generally include an upper skin, a lower skin, a honeycomb core, and a connecting side wall. The upper skin is typically provided with a plurality of tapped holes which are used for mounting equipment upon the tabletop surface. The honeycomb core maintains the structure rigidity and flatness of the upper skin so as to minimize the displacement of the devices relative to one anther. Historically, granite plates have been used as optical tables. However, their large weight and the difficulty of attaching components to their surfaces make them cumbersome to use.

Unfortunately, the tapped holes in the upper skin provide access to the cells of the honeycomb core in the interior of the optical table. Thus liquid or other debris spilled upon the table surface may pass into the interior. Due to the boned structure of the honeycomb and the complexity of the interior configuration, such spills are difficult and impractical to clean. Accordingly, conventional tabletops cannot satisfy the needs of usage in and maintenance of clean rooms.

Various methods of construction are known to solve these problems. Specifically, U.S. Pat. No. 4,621,006 discloses a tabletop design wherein a sealing sheet is positioned between a first distance honeycomb core portion adjoining the lower layer and a second distance several times honeycomb core portion adjoining the upper skin. The second distance is several times the mentioned first distance. So that the honeycomb core portion adjoining the lower layer is sealed off by the sealing sheet, and only a smaller distance of the honeycomb core portion needs to be cleaned.

U.S. Pat. No. 4,645,171 describes a honeycomb optical table wherein each hole in the top surface is sealed off from the interior of the honeycomb cells by a cavity enclosure which is secured to the underside of the top skin in connection with each hole. The cavity enclosures prevent the residue and contaminant from passing to the interior of the honeycomb core. As a result, cleanup can be effectively accomplished by wiping the table surface and applying suction to the small enclosure.

In U.S. Pat. No. 4,853,065 and U.S. Pat. No. 5,021,282, the use of a sealing sheet with projections corresponding in number and location to apertures in the table leavers and projecting into cells of honeycomb cores for a distance being several times smaller than the depth of such cores. It provides a means of sealing the holes of the upper layer from the honeycomb core.

U.S. Pat. No. 5,061,541 describes a honeycomb optical table with at least a layer of rigid corrugated material comprised of valleys and crests, an internal stiffening sheet, a drilled and tapped bar, and a series of connected cups to seal off from interior of the honeycomb cells which is secured to the underside of the top skin. The longitudinal axes of the crests and valleys of the said rigid corrugated material are aligned generally parallel to the both facing sheets and perpendicularly to the longitudinal axes of the cells of honeycomb core.

Another honeycomb optical table design is disclosed in U.S. Pat. No. 5,402,734, wherein a number of cups are positioned between the bottom layer and the top layer, and at least some of the cups are sized and shaped so as to cooperate with the lower face of the top layer to form a cavity surrounding at least two of the holes in the top layer so that contaminants will be unable to pass through the surrounding holes into the honeycomb core.

Although above-mentioned designs exhibit varying levels of effectiveness in containing the contaminants and spills easily and isolating from residue or contaminants entering the interior of the tabletop, no existing design appears to adequately address the need for easy and thorough cleaning of the portion of the tabletop exposed to the tapped holes.

In this invention, we describe an optical table having an easily-cleaned structure by using a downwards tread of object in field of gravity. Spillage, contaminants and residue can be more easily cleaned from the top down.

BRIEF SUMMARY OF THE INVENTION

Broadly, this invention provides an optical table to overcome the disadvantages or to meet the needs expressed or implied in the above-mentioned statement or in other parts of this disclosure. Further, the invention provides a tabletop the upper skin of which is constructed in such way that spillage and contaminants may be easily cleaned from the table surface and spills will not enter the interior of the tabletop.

The invention features an optical table including an upper skin tapped with holes for mounting equipment, a honeycomb core, a connecting side wall, a lower skin with a plurality of through holes which are coaxial with the tapped holes on the upper skin in a one to one arrangement, a number of tubes are positioned between the upper skin and the lower skin to connect the holes on both of the skins.

In other exemplary embodiments, the optical table includes a plurality of small cups. The small cups are made from chemically resistant nylon or similar material, and are put on and entered into the through holes or the tubes with magnitude of interference to keep the dust form entering into the tubes. In the portion of lower skin which the support system to deposited, the through holes or the tubes can be covered with small cups or can be left uncovered. The length of the small cups can be equal the depth of through holes, or is shorter than the depth of the through holes, or extend into the tubes, and even into the interior of upper skin.

In certain other exemplary embodiments, the optical table includes a plurality of big cups. These big cups are placed on the upper end of support legs to keep the dust form entering into the holes. The internal surfaces of the big cups have cladding material to prevention of corrosion. The big cups are attached to and reinforced on the lower skin using bolts, and match the dimension of the support legs.

In certain other embodiments, the diameter of the through holes can equal or not equal the diameters of the tapped holes, so that the diameter of the tubes can be different from the diameter of the tapped holes or the through holes. Accordingly, the shape of the tubes which connect the holes on both skins is coniform, pyramidal, or columnar, or otherwise tubular in shape. But the inner diameter or inscribed circle diameter of one tube end which is near the upper skin is not smaller than the diameter of the tapped holes, and the outer diameter or excircled circle diameter of another tube end which is near the lower skin is not smaller than the diameter of the through holes. When the outer diameter or excircled circle diameter of the tube end which is near the lower skin equals the diameter of the through holes, the tubes extend into the through holes.

In other aspects, the invention provides an optical table including a number of the tubes. Each tube with two holes which are coaxial and pass through both skins apart composes a passage to keep the spills and residue from entering into the interior of the honeycomb core. The tubes are made of metal or high polymer synthetic material having anti-corrosive properties, and glues onto the interior of both skins or onto the interior of the upper skin and the through holes.

The interior honeycomb core of the optical table of the invention is sealed in a way that prevents the entry of substances that can contaminate the core and other similar structures. Passages within the honeycomb core, which are composed of tubes, tapped holes and through holes allow for contaminates to be more easily cleaned from the top down. Moreover the small cups which cover the through holes or tubes can contain and keep out the residue momentarily and prevent the dust from entering into the honeycomb core via the through holes. When needed, the small cups are removed and cleaned. The design of the optical table provides the need of easy and thorough cleaning of the portion of the tabletop exposed to the tapped holes without weakening the rigidity of the optical table.

BRIEF DESCRIPTION OF THE DRAWINGS

Many of the attendant advantages of the present invention will become more readily apparent and better understood as the following detailed description is considered in connection with the accompanying drawings in which:

FIG. 4B is another alternative embodiment to that depicted in FIG. 2 with small cups at the end of tubes;

FIG. 4C is another alternative embodiment to that depicted in FIG. 4A;

FIG. 5A is an enlarged view of one of the small cups illustrated in FIG. 4A;

FIG. 5B is an alternative embodiment to that depicted in FIG. 5A;

FIG. 5C is another alternative embodiment to that depicted in FIG. 5A;

DETAILED DESCRIPTION OF THE INVENTION

Figure 1:
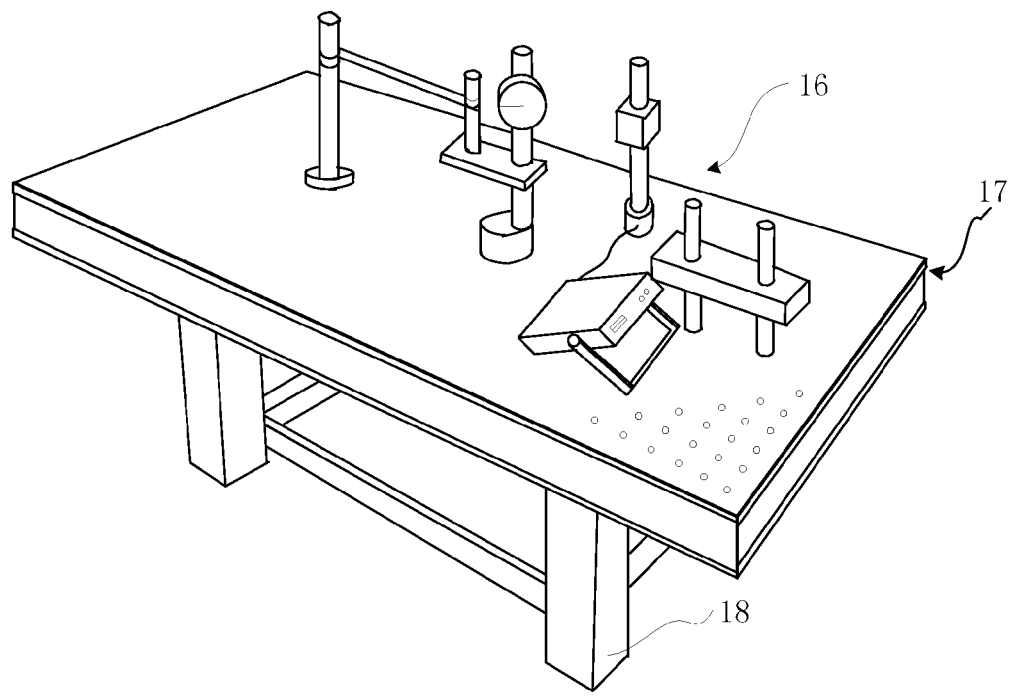
FIG. 1 is a perspective view of a vibration-isolating table with a honeycomb tabletop.

As shown in FIG. 1, a vibration-isolating table 16 is used to support laboratory equipment. The table consists of a honeycomb tabletop 17 and supporting vibration-isolating systems 18.

Figure 2:
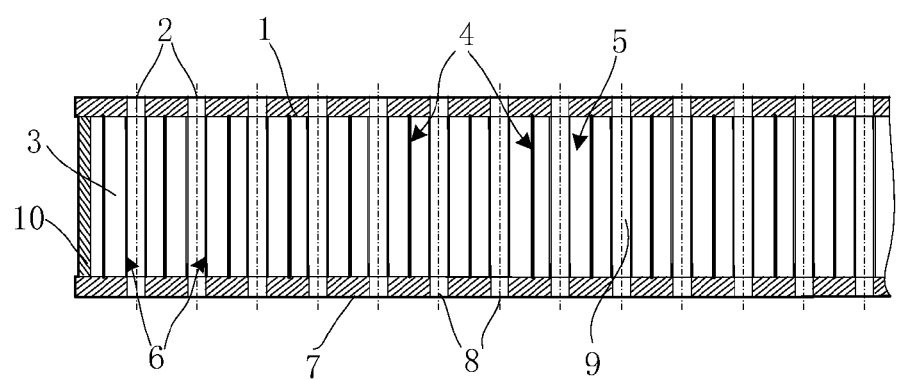
FIG. 2 is a side cross-sectional view of the tabletop of an exemplary embodiment depicted in FIG. 1.
Figure 3:
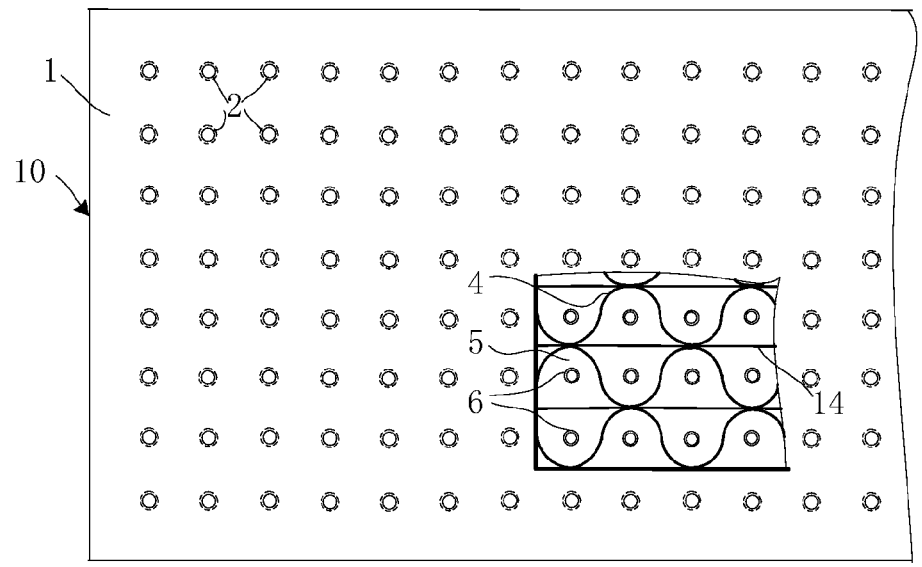
FIG. 3 is a top plan view of the tabletop with parts removed in a section to disclose the internal structure according to an embodiment of the subject invention.

With reference to FIGS. 2 and 3, the honeycomb tabletop 17 of this invention comprises an upper skin 1 having a plurality of tapped holes 2 used for mounting equipment upon the tabletop 17. The tabletop 17 also has a lower skin 7 with a plurality of through holes 8 which are coaxial with the tapped holes 2 on the upper skin 1 in a one to one arrangement, and a connecting side wall 10. Together with the upper skin 1, the lower skin 7 defines a honeycomb core 3. Within the honeycomb core 3 are placed a plurality of metallic vertical members 4 which form a number of honeycomb cells 5. Additional internal damping material (not shown in this drawing for clarity) may be incorporated to minimize the vibration products of normal tabletop flexural modes and other induced vibrations.

In the honeycomb core 3, there are a number of tubes 6 positioned between the interior surface of upper skin 1 and lower skin 7. With the tapped holes 2 and the through holes 8, the tubes 6 form passages 9 in the honeycomb cores 3 to ensure the contaminants and residue will be unable to enter into the interior of the honeycomb core 3. The tubes 6 made of metal or high polymer synthetic material having anti-corrosive properties. As best illustrated in FIG. 3, the metallic vertical members 4 define the closed honeycomb cells 5 forming the honeycomb core 3 which lie between the upper skin 1 and lower skin 7. The honeycomb core 3 with stiffening trusses 14 meet the pattern of array.

Figure 4A:
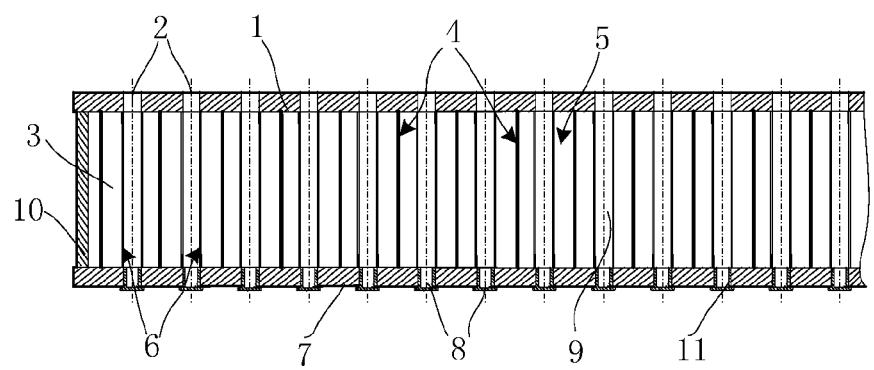
FIG. 4A is an alternative embodiment to that depicted in FIG. 2 with small cups disposed on the through holes.

Referring to FIGS. 4A, 4B and 4C, alternative embodiments of the optical table include an upper skin 1 and a lower skin 7, a honeycomb core 3, a connecting side wall 10 and a plurality of small cups 11. The small cups 11 which are made from chemically resistant nylon or similar material put on and entered into the through holes 8 or the tubes 6 with magnitude of interference.

The diameter of the through holes 8 can equal or not equal to the diameter of tapped holes 2, so that the diameter of tubes 6 can equal or not equal to the diameter of tapped holes 2 or through holes 8 or both types of holes. Accordingly, the shape of tubes 6 which connect the holes on both skins is coniform, pyramidal, or columnar, or other tubular shape. However, the inner diameter or inscribed circle diameter of one tube end which is near the upper skin 1 is not smaller than the diameter of tapped holes 2, and the outer diameter or excircled circle diameter of another tube end which is near the lower skin 7 is not smaller than the diameter of through holes 8.

The tubes 6 are glued onto the interior of both skins, or onto the interior of upper skin 1 and through holes 8.

As best shown in FIGS. 5A, 5B and 5C, the length of the small cups 11 can be equal to the depth of the through holes 8, or be shorter than the depth of the through holes 8, or extend into the tubes 6, and even into the interior of upper skin 1.

Figure 6A:
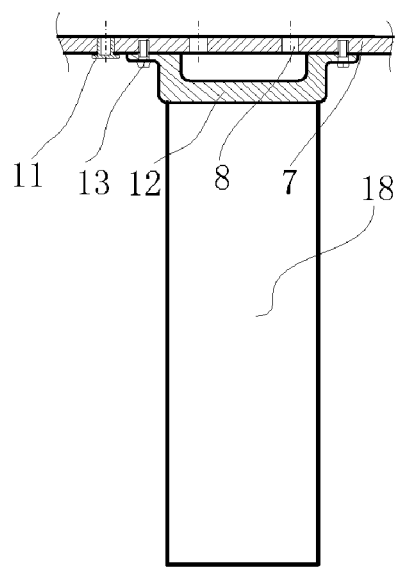
FIG. 6A is a cross-sectional view of alternative embodiment of FIG. 4A with big cups on support legs.
Figure 6B:
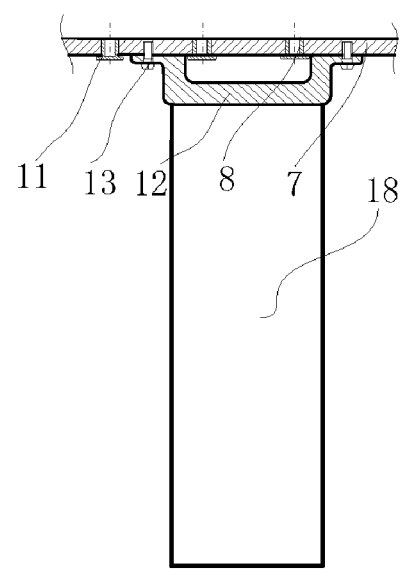
FIG. 6B is an alternative embodiment to that depicted in FIG. 6A.

In other embodiments, as shown in FIGS. 6A and 6B, big cups 12 are put onto the upper end of the supporting vibration isolation legs 18 and are reinforced on the lower skin 7 using bolts 13. The dimension of the big cups matches the dimension of the support legs. The internal surfaces of the big cups 12 have cladding material to prevent corrosion.

Finite element analysis has been used to determine that this design changes the rigidity of the optical table slightly. However, the rigidity of the optical table can be maintained by increasing the lower skin thickness somewhat.

Various modifications may be made in the foregoing description without departing from the scope of the invention. It is intended that all matter contained in the above description and depicted in the accompanying drawings be construed in an illustrative and not in limiting sense.

What is claimed is:

1. An optical table comprising a tabletop comprising an upper skin tapped with a plurality of holes for mounting equipment and a lower skin having a plurality of through holes; a honeycomb core; a side wall connecting said upper and lower skins; a plurality of tubes disposed between said upper and said lower skins, said tubes connecting said tapped holes and said through holes; and a plurality of big cups and a supporting vibration-isolating system having a plurality of legs, wherein said big cups are inserted into said legs.

2. The optical table of claim 1 wherein the internal surfaces of said big cups have a cladding material to prevent corrosion.

3. The optical table of claim 1 wherein said big cups are placed on or bolted onto the support legs and reinforced on said lower skin with bolts, and match with the dimension of the support legs.

4. The optical table of claim 1 comprising a plurality of passages within said honeycomb core, said passages comprising said tubes, said tapped holes and said through holes.

5. The optical table of claim 1 wherein the diameter of said through holes is equal or not equal to the diameter of said tapped holes.

6. The optical table of claim 1 wherein said tubes are made of metal or high polymer synthetic material having anti-corrosive properties.

7. The optical table of claim 1 wherein said tubes are glued onto the interior of both skins or onto the interior of said upper skin and said through holes.

8. An optical table comprising a tabletop comprising an upper skin tapped with a plurality of holes for mounting equipment and a lower skin having a plurality of through holes; a honeycomb core; a side wall connecting said upper and lower skins; a plurality of tubes disposed between said upper and said lower skins, said tubes connecting said tapped holes and said through holes, wherein
   the shape of said tubes is columnar;
   the inner diameter of one tube end which is near said upper skin is not smaller than the diameter of said tapped holes, and the outer diameter of another tube end which is near the said lower skin is not smaller than the diameter of said through holes; and
   when the outer diameter of said tube end which is near the said lower skin equals the diameter of said through holes, said tubes extend into said through holes.

9. An optical table comprising a tabletop comprising an upper skin tapped with a plurality of holes for mounting equipment and a lower skin having a plurality of through holes; a honeycomb core; a side wall connecting said upper and lower skins; a plurality of tubes disposed between said upper and said lower skins, said tubes connecting said tapped holes and said through holes,
   wherein
     the inner diameter of one tube end which is near said upper skin is not smaller than the diameter of said tapped holes, and the outer diameter of another tube end which is near the said lower skin is not smaller than the diameter of said through holes; and
   when the outer diameter of said tube end which is near the said lower skin equals the diameter of said through holes, said tubes extend into said through holes.

* * * * *